3,823,107
EPOXY RESIN CURING AGENT COMPOSITIONS, THEIR PREPARATION AND USE

Malcolm Cotton, Wokingham, England, assignor to Shell Oil Company, New York, N.Y.
No Drawing. Filed Mar. 9, 1972, Ser. No. 233,303
Claims priority, application Great Britain, Mar. 11, 1971, 6,569/71; Sept. 8, 1971, 41,916/71
Int. Cl. C08f 27/08
U.S. Cl. 260—23.7 N        8 Claims

ABSTRACT OF THE DISCLOSURE

Epoxy curing agent compositions which are especially suitable to cure solid, solution or liquid solventless polyepoxide systems comprises (1) a polyamine and (2) a reaction product of (a) the same or different polyamine, (b) a polymer having per molecule more than one reactive group capable of reacting with amine and/or epoxide groups, and optionally, (c) a polyepoxide.

BACKGROUND OF THE INVENTION

The use of carboxyl-containing rubber polymers to cure polyepoxides has been employed in attempt to improve flexibility and adhesion; however, the addition of carboxyl-terminated liquid copolymers of butadiene and acrylonitrile such as Hycar CTBN and Hycar CTBNX produce very little improvement in such physical properties.

It is also known that epoxy resins can be cured, i.e., converted into an insoluble, infusible mass, by reaction with amine compounds having hydrogen atoms attached to nitrogen. Curing conditions depend on the nature of the amine compounds, so aromatic amines will cure generally at elevated temperatures, and aliphatic amines will cure at ambient temperatures or above. Very few amine compounds will induce acceptable cure at sub-ambient temperatures, for example, about 0° C., and if they induce cure the properties of the cured product are generally defective with respect to hardness, flexibility, impact resistance and/or adhesion to a substrate. In particular, for solventless polyepoxide coating systems, there is a need for curing agents to improve one or more of the above-mentioned properties.

It has now been found that such improvement in physical properties is obtained without detrimental effect to hardness by pretreating such reactive polymers with polyamines, preferably liquid diprimary amines.

SUMMARY OF THE INVENTION

The present invention is directed to epoxy resin curing agent compositions and to their preparation and use.

The epoxy resin curing agent compositions described herein may be used to cure solid, solution or liquid solventless polyepoxide systems. Accordingly, the present invention provides epoxy resin curing agents which can cure liquid solventless polyepoxides to produce hard surface coatings having improved flexibility, impart resistance and adhesion to substrates. Such compositions may be used to cure polyepoxide systems at ambient or elevated temperatures or, in some cases, it depressed temperatures such as about 0° C.

DESCRIPTION OF THE PREFERRED EMBODIMENTS

According to the present invention, an epoxy resin curing agent composition which is particularly suitable for curing solventless polyepoxide coating systems comprises the soluble reaction product of (a) one or more diprimary amines, (b) a polymer having per molecule more than one reactive group capable of reacting with amine and/or epoxide groups, the polymer having a molecular weight of more than 1,000 and a reactive equivalent weight of more than 500, and (c), optionally, a polyepoxide, the amount of (a) in equivalents being so much in excess over the amounts of (b) and (c) in equivalents that the reaction product contains free diprimary amine in an amount of less than 80 weight percent of the total reaction product.

As the novel curing agent compositions contain less than 80 weight percent of free diprimary amine, they contain at least 20%, and more preferably, at least 50% by weight of reaction products of (a), (b) and (c), or at least 20%, and more preferably at least 40% by weight of reaction products of (a) and (b).

The compositions can be in the solid or liquid state at ambient temperature. The compositions may be dissolved or diluted with diluents, such as benzyl alcohol, dibutyl phthalate, furfuryl alcohol or pine oil, with benzyl alcohol being preferred.

Preferably, the compositions comprise less than 50% by weight, more preferably less than 20% by weight, based on weight of undiluted composition, of diluent. Such diluted compositions have preferred viscosities of below about 700 poise at 25° C. The preferred diluted compositions are homogeneous at ambient temperature.

The compositions may also comprise preferably less than 20% by weight, based on weight of undiluted composition of a compound which accelerates the reaction between epoxide groups and amine groups. Suitable accelerators include salicylic acid, benzyl dimethylamine, triphenyl phosphite, tris-2,4,6-dimethylamine-methyl phenol, lactic acid and para-toluene sulphonamide.

The compositions, according to the invention, can be prepared by reacting together one or more polyamines, a reaction polymer and optionally, a polyepoxide, wherein the amounts of the reagents are such that the product comprises unreacted polyamine. If desired, diluents and/or accelerators may then be added.

The polyamines suitable for preparing the present compositions are aliphatic or aromatic polyamines having two primary amine groups per molecule; they are, therefore, diprimary amines. The polyamine may be solid at ambient temperature, for example 4,4'-diamino-diphenylmethane, hexamethylene diamine, or meta-, para- or ortho-phenylene diamine, or liquid at ambient temperature, for example, ethylene diamine, trimethylhexamethylene diamine, diethylene triamine, 1-amino-3-aminomethyl-3,5,5-trimethylcyclohexane (isophorone diamine), cyclohexylpropylene diamine, 4,4'-diaminodicyclohexylmethane, and 3,3'-dimethyl - 4,4 - diaminodicyclohexylmethane. Certain polyamines, such as tetramethylene diamine which has a melting point of, say 25° to 30° C., may be in the solid or liquid state depending on the ambient temperature. If the polyamine used is in the solid state at ambient temperature, it may be used as such or in solution. Preferably, liquid polyamines are used if the reaction mixture does not contain a polyepoxide.

In diprimary amines, the four hydrogen atoms attached to nitrogen can react with reactive groups of reactive polymers and with epoxy groups of polyepoxides. Useful for calculations is the amino hydrogen equivalent weight, that is the molecular weight of the amine divided by the number of hydrogen atoms per molecule attached to nitrogen. The diprimary amines preferably used in the present invention have, generally, amino hydrogen equivalent weights between 40 and 60.

The polyepoxides which may be used as reaction component in the present curing agent compositions are those compounds possessing on average more than one vicinal epoxy group, i.e., a

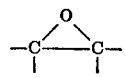

group per molecule. The number of epoxy groups contained in the average molecule is obtained by dividing the average molecular weight of the polyepoxide by the epoxide equivalent weight. The polyepoxides may be saturated or unsaturated, aliphatic, cycloaliphatic, aromatic or heterocyclic and may be substituted, if desired, with non-interfering substituents, such as hydroxyl groups and other radicals. The polyepoxides may be in the liquid or solid state at ambient temperature and may be monomeric or polymeric.

Preferred polyepoxides in the present invention are polyglycidyl esters of polymeric unsaturated fatty acids, for example, diglycidyl esters of dimerized linoleic acid; technical diglycidyl esters of dimerized linoleic acids have generally epoxy equivalent weight between 390 and 470.

Other suitable polyepoxides are glycidyl ethers of polyhydric phenols, such as diphenylol alkanes, for example 2,2-bis(4-hydroxyphenyl) propane, 1,1-bis(4-hydroxyphenyl)-ethane and bis(4-hydroxyphenyl)-methane, 4,4'-dihydroxydiphenyl sulphone, hydroquinone, resorcinol, dihydroxydiphenyl, dihydroxy naphthalenes, and polyhydric phenols such as novolacs and resoles prepared by condensation of phenol or cresols with formaldehyde.

Such glycidyl ethers of polyhydric phenols can be prepared, for example, by reaction of the polyhydric phenol with epichlorohydrin in the presence of a base, such as sodium hydroxide or potassium hydroxide. Important polyepoxides are the glycidyl ethers of 2,2-bis(4-hydroxyphenyl) propane. The molecular weight and also the softening point, the epoxide equivalent weight and the viscosity generally depend on the ratio of epichlorohydrin to 2,2-bis(4-hydroxyphenyl) propane. If a large excess of epichlorohydrin is used, e.g. 10 molecules of epichlorohydrin per molecule of 2,2-bis(4-hydroxyphenyl) propane, the reaction product is a glycidyl ether of low molecular weight, which is usually a viscous liquid. If the ratio of epichlorohydrin to 2,2-bis(4-hydroxyphenyl) propane is between 2:1 to 1:1 the reaction product is a glycidyl polyether of elevated molecular weight of the general formula

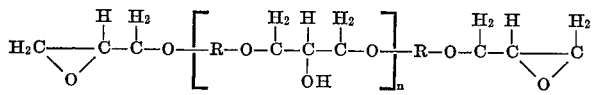

wherein R is the divalent hydrocarbon residue

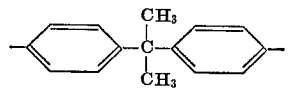

and $n$ is a number between 1 and 20. These polyepoxides are usually solid at ambient temperature, with softening points between 50 and 170° C., and may be used as such or in solution. Suitable solvents include ketones and esters.

Other suitable polyepoxides are poly(epoxyalkyl) ethers of aliphatic polyhydroxy compounds such as ethylene glycol, glycerol, trimethylol propane, and pentaerythritol; polyglycidyl esters of polycarboxylic acids such as the diglycidyl esters of phthalic acid, terephthalic acid, adipic acid, tetrahydrophthalic acid, hexahydrophthalic acid; epoxidized esters of unsaturated acids, such as epoxidized linseed oil, epoxidized dienes such as diepoxybutane, epoxidized vinylcyclohexane, and 3,4-epoxy-6-methylcyclohexyl-methyl ester of 3,4-epoxy-6-methylcyclohexane carboxylic acid and similar compounds. Mixtures of polyepoxides described above and mixtures with monoepoxides may also be used, for example, to reduce the viscosity of a polyepoxide.

The reactive polymers suitable for preparing the compositions are defined herein as polymers having a molecular weight of more than 1,000, preferably more than 3,000, for example between 3,000 and 5,000, and having more than one reactive group per molecule capable of reacting with amine and/or epoxy groups, and having a reactive equivalent weight of more than 500. Examples of such reactive groups are carboxyl, hydroxyl, halogen and mercaptan groups. The reactive polymers, preferably, comprise a plurality of butadiene or alkylene oxide units. Suitable reactive polymers may be in the liquid or solid state at ambient temperature, with those in the liquid state being preferred. Preferred liquid reactive polymers have Brookfield viscosities at 25° C. of less than 2,000 poise. If reactive polymers having only mercaptan groups or hydroxyl groups are used then the reaction mixture should also, preferably, comprise a polyepoxide.

Preferred reactive polymers are copolymers of butadiene and acrylonitrile, having molecular weights of more than 1,000, preferably more than 3,000, for example, between 3,000 and 5,000, having as reactive groups carboxyl or mercaptan groups having carboxyl- or mercapto-equivalent weights of more than 500, and having Brookfield viscosities at 25° C. of less than 2,000 poise.

As examples of suitable reactive polymers are included copolymers of butadiene and acrylonitrile having reactive groups. Suitable polymers include "Hycar" CTBN, "Hycar" CTBNX and "Hycar" MTBN. "Hycar" CTBN is a butadiene-acrylonitrile copolymer having terminal carboxyl groups which may be represented structurally:

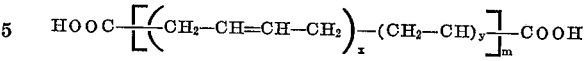

wherein, on the average $x=5$, $y=1$ and $m=10$; it has a Brookfield viscosity at 27° C. of 1,310 poise, an average number molecular weight of 3,080, an equivalent weight per carboxyl group of 1,885, an equivalent weight of carboxyl group per hundred parts of polymer of from 0.04 to 0.08 and a carboxyl group functionality of 1.735. "Hycar" CTBNX is a butadiene-acrylonitrile copolymer having terminal and pendant carboxyl groups; it has a Brookfield viscosity at 27° C. of 1,500, an average number molecular weight of 3,365, an equivalent weight per carboxyl group of 1,540, an equivalent weight of carboxyl group per hundred parts of polymer of from 0.05 to 0.09 and a carboxyl group functionality of 2.34. "Hycar" MTBN is a butadiene-acrylonitrile copolymer having terminal mercaptan groups; it has a Brookfield viscosity at 27° C. of 350 and from 0.09 to 0.14 mercaptan equivalents per hundred grams.

Other examples of suitable reactive polymers include homopolymers of butadiene having reactive groups. Suitable polymers include "Hycar" CTB, "Hycar" MTB and "Butarez" HTP and "Thiokol" HC434. "Hycar" CTB is a butadiene homopolymer having terminal carboxyl groups; it has a Brookfield viscosity at 27° C. of 354 poise, a carboxyl group functionality of 2.01, and an average number molecular weight of 4,370. "Hycar" MTB is a butadiene homopolymer having terminal mercaptan groups; it has a Brookfield viscosity at 27° C. of 200 poise and an average number molecular weight of 3,000. "Butarez" HTP is a butadiene homopolymer having pendant hydroxyl groups: it has an average molecular weight of about 5,000 and a functionality of 2. "Thiokol" HC434 is a butadiene homopolymer having terminal carboxyl groups; it has a Brookfield viscosity at 25° C. of 250 poise and a functionality of 2.

Further examples of suitable reactive polymers include copolymers of styrene-butadiene, homopolymers of epichlorohydrin and copolymers of epichlorohydrin and an alkylene oxide, such as ethylene oxide, having reactive groups. Suitable polymers include "Herchlor" H and "Herchlor" C. "Herchlor" H is an epichlorohydrin homopolymer having terminal and pendant chlorine atoms: it is a solid at ambient temperature and has an average number molecular weight of 500,000. "Herchlor" C is an epichlorohydrin-ethylene oxide copolymer; it is also a solid at ambient temperature and has an average number molecular weight of 1,250,000.

Generally, the novel curing agents are prepared by reacting in one or more stages the amine (a), the polymer (b), and optionally the polyepoxide (c) at elevated temperature, the amount of (a) in equivalents being so much in excess over (b) and (c) in equivalents that the reaction product contains free diprimary amine in an amount of less than 80 weight percent of the total reaction product.

According to a first embodiment of the process according to the invention, the compositions can be prepared by reacting together one or more liquid diprimary amines and a reactive polymer having more than one carboxyl group per molecule, wherein the amounts of the reagents are such that the product comprises unreacted polyamine, and the liquid polyamine is reacted with the polymer at a temperature of from 150° to 220° C. The reaction is continued until the desired reaction level, which can be followed by determining the acid value of the reagents at suitable time intervals, is reached. The reaction level is the percentage of carboxyl groups reacted with formation of amide bonds. The reaction is continued until the reaction level is greater than 30%, more preferably greater than 50%. The reaction may be carried out in the presence of a small amount, say from 3 to 5% by weight, based on weight of reaction mixture, of a refluxing agent, such as xylene to facilitate the removal of the water liberated during the reaction.

The reaction results in formation of amide bonds by reaction of amine groups of the diprimary amine with carboxyl groups of the carboxyl-containing polymer, with elimination of water.

The amount of each reagent used in the first embodiment varies according to the functionality and nature of the reagents, but is such that the composition comprises unreacted polyamine. Generally, from 20 to 300 parts by weight of the carboxyl-terminated reactive polymer are reacted with 100 parts by weight of the diprimary amine, that amounts to less than 0.02–0.3 equivalents of reactive polymer per amino hydrogen equivalent of diprimary amine if the latter has an amino hydrogen equivalent weight of about 50. Expressed in another way, generally from 5 to 75 moles of diprimary amine are used per mole of carboxyl-terminated reactive polymer.

According to a second embodiment of the process according to the invention, a process for preparing the compositions comprises reacting in a first stage (a) one or more diprimary amines with a reactive polymer, and (b) reacting the product obtained in stage (a) with a polyepoxide, wherein the amount of reagents used is such that the product obtained in stage (b) comprises unreacted polyamine. In stage (a) the polyamine is reacted with the reactive polymer at a temperature of from 150° to 220° C. The reaction is continued until the desired reaction level is reached as described above. Stage (a) reaction may be carried out in the presence of a refluxing agent, such as xylene, to facilitate the removal of water of reaction in case a carboxyl-containing polymer is used. Reaction of carboxyl-containing polymers and amines results in formation of amide bonds with elimination of water. The refluxing agent is, preferably, removed, for example, by distillation, before the polyepoxide is added in stage (b).

The temperature of the products is suitably lowered to about 150° C. before the polyepoxide is added in stage (b). The addition may be made over a period of time, e.g., 10 to 20 minutes and the reaction is, preferably, continued for a further 15 minutes at about 150° C.

The amount of reagents used in stages (a) and (b) may vary according to the functionality and nature of the reagent, but is such that the composition comprises unreacted polyamine. Generally in stage (a), from 20 to 60 parts by weight of the reactive polymer are reacted with 100 parts by weight of a diprimary amine, that amounts to less than 0.02–0.06 equivalents of reactive polymer per amino hydrogen equivalent of diprimary amine having an amino hydrogen equivalent weight of about 50. In stage (b), the weight of the polyepoxide added to the reaction product obtained in (a) is generally from 20 to 60 parts by weight if a polyepoxide having an epoxy equivalent weight between 390 and 470 is used and if the reactive polymer used in (a) has carboxyl groups; that amounts to about 0.025 to 0.075 epoxy equivalents of polyepoxide per amino hydrogen equivalent of diprimary amine if the latter has an amino hydrogen equivalent weight of about 50. If the reactive polymer comprises mercaptan groups then preferably from 30 to 90 parts by weight of difunctional polyepoxide are added in stage (b).

The above second embodiment may be modified by adding the polyamine to the reactive polymer in two stages. For example, a stoichiometric amount of polyamine may be added to the reactive polymer initially and then the remaining amount of polyamine may be added. Preferably, the temperature of the reagents is at a temperature of from 140° to 170° C. before the second amount of polyamine is added.

According to a third embodiment of the process according to the invention, a process for preparing the composition comprises (a) reacting the reactive polymer with an excess (in equivalents) of the polyepoxide, and (b) reacting the product obtained in stage (a) with the polyamine, wherein the amount of reagents is such that the product obtained in stage (b) comprises unreacted polyamine.

Preferably, in stage (a) the polyepoxide is reacted with the reactive polymer at a temperature of from 110° C. to 150° C. for from 0.5 to 4 hours. If the reactive polymer comprises carboxyl groups then an accelerator, such as benzyl dimethylamine, may be added, and the reaction, preferably, stopped immediately when the acid value reaches zero, i. e., when a 100% reaction level is reached.

In stage (b), the product obtained in stage (a) is, preferably added to the polyamine. Generally, the stage (b) reaction is continued for from 10 to 45 minutes.

The preferred amounts of reagents used in stage (a) and stage (b) again may vary according to the functionalities and the nature of the reagents but are such that the composition comprises unreacted polyamine. Generally, in (a) from 30 to 120 parts by weight of a difunctional polyepoxide are reacted with from 20 to 60 parts by weight of a reactive polymer having more than one carboxyl group per molecule, and in (b) 100 parts by weight of difunctional polyamine are reacted.

The viscosity of the composition, prepared by the process according to the invention can, if desired, be reduced by the addition of suitable diluents, such as benzyl alcohol to the above epoxy curing agent composition. If it is desired that an accelerator, such as salicylic acid should be present then the temperature of the above diluted epoxy curing agent composition is, preferably, reduced to about 80° C. before such an accelerator is added. The reaction may then be continued for a further 40 to 80 minutes at about 80° C.

Suitable amounts of diluents and/or accelerators to be added, if desired, to the composition prepared in (b) are less than 50%, preferably, less than 20% by weight and less than 20% by weight, based on weight of undiluted composition, respectively.

The compositions according to the invention can be used to cure epoxy resins in solution or liquid solventless systems. Accordingly, the invention is also concerned with a process for curing a polyepoxide to an insoluble, infusible product which comprises curing the polyepoxide in the presence of a composition as herein described. Suitable curable polyepoxides include those described above as being suitable for use in preparing the compositions. The process can be used for the manufacture of shaped articles by casting, coating, or impregnating an article with a curing composition comprising a polyepoxide and a composition as herein described and curing the composition.

The process is particularly suitable for preparing surface coatings. According to this aspect of the invention a surface coating is prepared by applying to a surface a mixture comprising a polyepoxide and a composition as herein described, said polyepoxide and composition being in the liquid state at ambient temperature, and allowing the mixture to cure. Advantageously, the cured surface coatings are heterogeneous. One advantage of this process is that the mixture cures in a short period of time without the application of heat to form hard coatings having good flexibility, impact resistance and adhesion to their substrate.

The amount of reacted reactive polymer in the cured surface coating varies according to the amount of reactive polymer used to prepare the composition. Suitably, the cured surface coating comprises from 5 to 30% by weight of the reacted polymer, based on the weight of polyepoxide in the cured system. The amount of diluent in the cured surface coating is, preferably, less than 10% by weight of the coating based on the weight of polyepoxide in the cured system.

The mixture suitable for preparing the aforesaid surface coatings may also comprise pigments, such as red, brown or black iron oxide, rutile titanium oxide, cadmium yellow or chromium oxide for thixotropic agents, such as "Thixin R," "Thixotrol" ST or "Aerosil" flow control agents, such as silicone resin R 281 and extenders, such as micronized asbestos or micronized talc. Such compositions may be sprayed on to the substrate preferably by airless spray equipment or may be applied by brushing or rollering.

The following examples are presented in order to illustrate the present invention. It is understood, however, that the examples are for the purpose of illustration only and that the invention is not to be regarded as limited to any specific conditions or reactants recited therein. Unless otherwise indicated, parts described in the examples are parts by weight.

EXAMPLE I 19.0 g. of a butadiene-acrylonitrile copolymer having terminal carboxyl groups ("Hycar" CTBN) were reacted with 47.9 g. of 4,4'-diaminodiphenylmethane (DDM) at 205° C. under nitrogen. The acid value of the reagents was followed until a 75.0% reaction level was reached. The temperature of the reaction mixture was then lowered to 150° C. and 28.1 g. of the diglycidyl ester of dimerized linoleic acid (Polyepoxide A) were added over 15 minutes. 18.75 g. of benzyl alcohol were added and the temperature of the reaction mixture lowered to 80° C. 6.25 g. of salicylic acid were then added.

The above reaction was repeated with the difference that the reaction level was 94.8%.

The above final compositions are designated compositions A and B, respectively, and the viscosities of the compositions are given in Table I.

EXAMPLE II

Example I was repeated with the difference that 9.5 g. of "Hycar" CTBN were reacted with 47.4 g. of DDM and that the reaction level was 91.0%. The final composition is designated composition C and the viscosity of the composition is given in Table I.

EXAMPLE III

Example I was repeated four times with the differences that 28.6 g. of "Hycar" CTBN were reacted with 48.4 g. of DDM and that the reaction levels were 24.8%, 76.6%, 92.5% and 95.0%, respectively. The final compositions are designated compositions D, E, F, G and H, respectively, and the viscosities of the composition are given in Table I.

EXAMPLE IV 28.6 g. of "Hycar" CTBN were reacted with 3.0 g. of DDM at 200° C. under nitrogen. The temperature of the reaction mixture was lowered to 150° C. with the addition of 45.4 g. of DDM. The acid value of the reagents was followed until a 90% reaction level was reached. 28.1 g. of Polyepoxide A were then added over 15 minutes and the reaction allowed to continue for a further 15 minutes. 18.75 g. of benzyl alcohol were added and the temperature of the reaction mixture lowered to 80° C. 6.25 g. of salicylic acid were then added.

The above final composition is designated composition I and the viscosity of such a composition is given in Table I.

EXAMPLE V 28.6 g. of "Hycar" CTBN were reacted with 34.3 g. of Polyepoxide A in the presence of 0.6 g. of benzyl dimethylamine as accelerator at 125° C. for 1 hour under nitrogen until the reaction level was 100%, i.e. an acid value of zero was obtained. The product was added to 46.9 g. of DDM over 15 minutes and the temperature increased to 140° C. and held there for 15 minutes. 18.75 g. of benzyl alcohol were added and the temperature of the reaction mixture lowered to 80° C. 6.25 g. of salicylic acid were then added.

The final composition is designated composition J and the viscosity of the composition is given in Table I.

TABLE I

| Composition: | Viscosity at 25° C. (poise) |
|---|---|
| A | 423 |
| B | 314 |
| C | 215 |
| D | 228 |
| E | 337 |
| F | 398 |
| G | 701 |
| H | 617 |
| I | 591 |
| J | 495 |

EXAMPLE VI

The epoxy resin curing compositions A to J prepared according to Examples I to V were used to prepare surface coatings from formulations comprising commercially available "Epon® Resin 828" (a glycidyl polyether of 2,2-bis(4-hydroxyphenyl) propane having an epoxide equivalent weight of from 182 to 194 and a viscosity at 25° C. of 100 and 150 poise). The base material to be cured comprised:

| | Percent by wt. |
|---|---|
| Epon® Resin 828 | 66.0 |
| Red iron oxide MR20 | 16.2 |
| Micronized asbestine W101 | 10.9 |
| Micro talc AT1 | 5.4 |
| "Thixatrol" ST | 1.5 |
| Silicon Resin R281 | 1.0 |

The amounts of epoxy resin curing agent compositions used to cure the above base material, are given in Table II. For comparison, the base material was cured with an epoxy resin curing agent composition not containing a reactive polymer. Such a curing agent was prepared by reacting excess DDM with a polyepoxide. This epoxy resin curing agent composition is described in the Tables as the control composition.

The base material was mixed with the curing agent composition and brush applied to degreased grit-blasted "Gold Seal" steel panels. The thickness of the applied films was about 250μ. The applied films were allowed to cure at ambient temperature (23° C.) for 8 days.

The film properties were measured using the following techniques:

Hardness—Konig pendulum DIN53,157
Flexibility and adhesion—
    (a) Erichsen slow penetration DIN50,101
    (b) Conical mandrel (Range 1½" down to ½") ASTM D522–41 and
    (c) Erichsen direct impact DIN53,156
    (d) Chip resistance tester.

For the purpose of determining the hardness of the films, the applied films were cured at 3° C. as well as at ambient temperature. The conical mandrel results are expressed in inches. According to this technique the flexibility of the film is described in terms of the diameter of the mandrel where the film begins to crack and the adhesion of the film is described in terms of the diameter of the mandrel where the film loses its adhesion to the plate.

The chip resistance tester consists of a guide tube through which 36 nuts and bolts (dropped 6 at a time), each weighing 187 to 188 g., are dropped through a height of 10.67 metres (3½ feet) on to panels fixed at an angle of 40°. A failure is classed as a region whereby a bolt penetrates to bare metal and the coating is removed from a region around this impact point. An impact which penetrates to bare metal in which the coating is still intact in the immediate vicinity of the impact point, is classed as a pass. The results are presented as the number of bolts, expressed as a percentage of the total number of bolts dropped, which cause failure.

The results of the above measurements are presented in Table II.

EXAMPLE VII 9.5 g. of a butadiene-acrylonitrile copolymer having pendant and terminal carboxyl groups ("Hycar" CTBNX) were reacted with 47.5 g. of DDM at 205° C. under nitrogen. The acid value of the reagents was followed until a 36.2% reaction level was reached. The temperature of the reaction mixture was then lowered to 150° C. and 28.1 g. of Polyepoxide A were added over 15 minutes. The reaction was allowed to continue for another 15 minutes. 18.75 g. of benzyl alcohol were added and the temperature of the reaction mixture lowered to 80° C.; 6.25 g. of salicylic acid were then added.

The above reaction was repeated with the difference that the reaction level was 79.0%.

The above final compositions are designated compositions A and B, respectively, and the viscosities of the compositions are given in Table III.

EXAMPLE VIII

Example VII was repeated five times with the difference that 19.0 g. of "Hycar" CTBNX were reacted with 48.1 g. of DDM and the reaction levels were 39.0%, 50.0%, 71.6%, 90.6% and 91.7%, respectively. The final compositions are designated compositions C to G, respectively, and the viscosities of the compositions are given in Table III.

EXAMPLE IX 19.0 g. of "Hycar" CTBNX were reacted with 2.4 g. of DDM at 200° C. under nitrogen, the temperature of the reaction mixture was lowered to 150° C. with the addition of 45.7 g. of DDM. The acid value of the reagents was followed until a 91.2% reaction level was reached. Polyepoxide A, benzyl alcohol and salicylic acid were added in the same manner as Example VII.

The final composition is designated composition H and the viscosity of the composition is given in Table III.

EXAMPLE X

Example VII was repeated six times with the differences that 28.6 g. of "Hycar" CTENX were reacted with 48.7 g. of DDM and the reaction levels were 39.0%, 60.3%, 72.5%, 75.5%, 91.5% and 92.5%, respectively. The final compositions are designated I to N, respectively, and the viscosities of the compositions are given in Table III.

EXAMPLE XI 28.6 g. of "Hycar" CTBNX were reacted with 3.6 g. of DDM at 200° C. under nitrogen. The temperature of the reaction mixture was lowered to 150° C. with the addition of 45.1 g. of DDM. The acid value of the reagents was followed until a 86.5% reaction value was reached. Polyepoxide A, benzyl alcohol and salicylic acid were added in the same manner as Example VII.

The final composition is designated composition O and the viscosity of the composition is given in Table III.

EXAMPLE XII

The epoxy resin curing agent compositions A to O prepared according to Examples VII to XI were used to prepare surface coatings by curing base material as described in Example VI and the results are presented in Table IV. The results obtained by curing the base material with the non-polymer-containing epoxy resin curing agent composition described in Example VI are also included.

TABLE III

| Composition | Viscosity at 25° C. (poise) |
| --- | --- |
| A | 206 |
| B | 219 |
| C | 286 |
| D | 426 |
| E | 469 |
| F | 570 |
| G | 404 |
| H | 423 |
| I | 471 |
| J | 496 |
| K | 432 |
| L | 443 |
| M | 943 |
| N | 599 |
| O | 690 |

TABLE II

| | Amount of curing agent composition used (g./100 g. base material) | König hardness (sec.) | | | | | | Erichsen Slow penetration (mm., average) | Direct impact (mm.) | Chip resistance tester (percent) | Conical mandrel (in.) | |
| --- | --- | --- | --- | --- | --- | --- | --- | --- | --- | --- | --- | --- |
| | | 24 hrs. at— | | 48 hrs. at— | | 8 days at— | | | | | Flexibility | Adhesion |
| | | 3° C. | 23° C. | 3° C. | 23° C. | 3° C. | 23° C. | | | | | |
| Curing agent composition used: | | | | | | | | | | | | |
| A | 51.0 | 5 | 127 | 22 | 142 | 80 | 148 | 2.2 | P 2½ | | P 1¼ | P 1⅛ |
| B | 52.4 | 5 | 133 | 20 | 140 | 78 | 147 | 1.8 | P 3 | | P ⅝ | F ½ |
| C | 49.1 | 5 | 113 | 26 | 146 | 85 | 153 | 1.9 | P 2½ | | P ⅞ | NLA |
| D | 52.4 | 7 | 146 | 27 | 154 | 83 | 158 | 1.3 | P 2½ | | P 1¼ | P 1⅛ |
| E | 53.9 | 3 | 131 | 16 | 141 | 55 | 148 | 2.8 | P 3 | 13.9 | P ⅝ | P ⅝ |
| F | 53.9 | 2 | 117 | 15 | 133 | 55 | 144 | 3.8 | P 3 | 0 | P ¾ | NLA |
| G | 56.1 | 1½ | 111 | 14 | 130 | 49 | 139 | 4.4 | P 3 | 0 | P ¾ | NLA |
| H | 57.4 | 4 | 115 | 23 | 136 | 77 | 143 | 1.9 | P 2½ | | P 1 | NLA |
| I | 56.6 | 4 | 115 | 22 | 134 | 73 | 140 | 2.7 | P 3 | | P ½ | NLA |
| J | 57.9 | 3 | 125 | 21 | 135 | 80 | 142 | 2.0 | P 2½ | 0 | P 1¼ | P 1⅛ |
| Control | 40.3 | 7 | 128 | 25 | 142 | 85 | 146 | 0.7 | P 2 | 19.5 | F 1½ | CLA |

NOTE.—CLA=Complete loss of adhesion to 1½" mandrel; NLA=No loss of adhesion to ½" mandrel.

EXAMPLE XIII 28.6 g. of a butadiene-acrylonitrile copolymer having terminal mercaptan groups ("Hycar" MTBN; 0.117 mercaptan equivalents per 100 g.) were mixed with 46.9 g. of DDM and heated to 150° C. for 3 hours. 42.8 g. of Polyepoxide A were then added over 15 minutes and the reaction allowed to continue for a further 15 minutes. 18.75 g. of benzyl alcohol were added and the temperature of the reaction mixture lowered to 80° C. 6.25 g. of salicylic acid were then added.

TABLE IV

| | Amount of curing agent composition used (g./100 g. base material) | König hardness (sec.) | | | | | | Erichsen | | Chip resistance tester (percent) | Conical mandrel (in.) | |
|---|---|---|---|---|---|---|---|---|---|---|---|---|
| | | 24 hrs. at— | | 48 hrs. at— | | 8 days at— | | Slow penetration (mm., average) | Direct impact (mm.) | | Flexibility | Adhesion |
| | | 3° C. | 23° C. | 3° C. | 23° C. | 3° C. | 23° C. | | | | | |
| Curing agent composition used: | | | | | | | | | | | | |
| A | 46.0 | 6 | 145 | 23 | 148 | 88 | 153 | 1.8 | P 2½ | ---------- | P 1 | NLA |
| B | 48.1 | 5 | 137 | 25 | 143 | 81 | 153 | 1.5 | P 2½ | ---------- | P 1⅛ | F ½ |
| C | 50.7 | 7 | 137 | 26 | 145 | 84 | 152 | 2.4 | P 2½ | ---------- | P ¼ | P ¾ |
| D | 49.8 | 4 | 134 | 20 | 142 | 60 | 152 | 2.5 | P 2½ | ---------- | P 1¼ | P 1¼ |
| E | 50.6 | 4½ | 128 | 20 | 137 | 55 | 148 | 3.1 | P 2½ | 5½ | P 1 | NLA |
| F | 56.8 | 6 | 118 | 21 | 125 | 70 | 143 | 2.4 | P 3 | 0 | P ¾ | NLA |
| G | 50.9 | 2 | 127 | 14 | 140 | 54 | 150 | 2.4 | P 2½ | ---------- | P 1¼ | F ½ |
| H | 52.0 | 3 | 124 | 16 | 136 | 55 | 147 | 4.8 | P 3 | 0 | P 1 | P ⅝ |
| I | 50.7 | 5 | 124 | 21 | 138 | 77 | 153 | 1.9 | P 3 | 0 | F ½ | NLA |
| J | 53.8 | 3 | 122 | 17 | 134 | 55 | 144 | 4.0 | P 2½ | ---------- | P ¾ | NLA |
| K | 55.9 | 3 | 111 | 19 | 134 | 71 | 138 | 5.9 | P 3½ | ---------- | P ½ | NLA |
| L | 54.8 | 3 | 117 | 17 | 131 | 57 | 145 | 5.7 | P 3½ | 0 | P ⅝ | NLA |
| M | 56.4 | 2 | 116 | 13 | 132 | 51 | 145 | 4.2 | P 3 | 0 | P ¾ | NLA |
| N | 59.1 | 4 | 113 | 21 | 139 | 75 | 141 | 5.7 | P 2½ | ---------- | P ¾ | NLA |
| O | 55.6 | 2 | 114 | 14 | 131 | 49 | 140 | 5.2 | P 3 | 0 | P ¾ | NLA |
| Control | 44.5 | 7 | 128 | 25 | 142 | 85 | 146 | 0.7 | P 2 | 19.5 | F 1½ | CLA |

Note.—CLA=Complete loss of adhesion to 1½" mandrel; NLA=No loss of adhesion to ½" mandrel.

The final composition is designated composition A. The composition has a viscosity of 275 poise at 25° C.

EXAMPLE XIV 28.6 g. of "Hycar" MTBN were reacted with 42.8 g. of Polyepoxide A for 3 hours at 140° C. The product was added to 46.9 g. of DDM and the reaction allowed to continue for a further 15 minutes. 18.75 g. of benzyl alcohol were added and the temperature of the reaction mixture lowered to 80° C. 6.25 g. of salicylic acid were then added.

The final composition is designated composition B. The composition has a viscosity of 290 poise at 25° C.

EXAMPLE XV

The epoxy resin curing agent compositions A and B prepared according to Examples XIII and XIV were used to prepare surface coatings by curing the base material as described in Example VI. The properties of the films were measured by the techniques described in Example VI and the results are presented in Table V. The results obtained for the film produced by curing the base material with the non-polymer-containing epoxy resin curing agent composition described in Example VI are also included.

TABLE V

| | Amount of curing agent composition used (g./100 base material) | Konig hardness (sec.) | | | | | | Erichsen | | Conical mandrel (in.) | |
|---|---|---|---|---|---|---|---|---|---|---|---|
| | | 24 hrs. | | 48 hrs. | | 8 days | | Slow penetration (mm. average) | Direct impact (mm.) | Flexibility | Adhesion |
| | | 3° C. | 23° C. | 3° C. | 23° C. | 3° C. | 23° C. | | | | |
| Curing agent composition used: | | | | | | | | | | | |
| A | 54.7 | 5 | 116 | 18 | 131 | 65 | 151 | 2.0 | P 2½ | P ¾ | F ½ |
| B | 60.4 | 2 | 123 | 16 | 135 | 64 | 147 | 1.6 | P 2½ | P ¾ | P ⅝ |
| Control | 40.3 | 7 | 128 | 25 | 142 | 83 | 146 | 0.7 | P 2 | F 1½ | CLA |

Note.—CLA=complete loss of adhesion to 1½" mandrel.

EXAMPLE XVI 40.0 g. of a butadiene-acrylonitrile copolymer having terminal carboxyl groups ("Hycar" CTBN) were heated with 110.2 g. of cyclohexyl propylene diamine (polyamine A) to a temperature of about 210° C. under nitrogen (about 55 moles of diamine per mole of "Hycar" CTBN). The acid value of the reagents was followed until a 90.0% reaction level was reached. The temperature of the reaction mixture was then lowered to about 120° C. and 40.0 g. of benzyl alcohol added. The reaction mixture (epoxy resin curing composition A) was cooled to ambient temperature.

EXAMPLE XVII

Example XVI was repeated with the differences that 130.6 g. of 3,3'-dimethyl - 4,4' - diamino-dicyclohexyl methane (polyamine B) were used as the polyamine. The product is designated epoxy resin curing composition B.

EXAMPLE XVIII 52.0 g. of polyamine A, 60.0 g. of polyamine B and 40.0 g. of benzyl alcohol were blended at ambient temperature to produce epoxy resin curing composition C for comparative purposes.

EXAMPLE XIX 30.0 g. of "Hycar" CTBN, 39.0 g. of polyamine A, 45.0 g. of polyamine B and 30.0 g. of benzyl alcohol were blended at ambient temperature to produce epoxy resin composition D for comparative purposes.

EXAMPLE XX 38.6 g. of a butadiene-acrylonitrile copolymer having terminal and pendant carboxyl groups ("Hycar" CTBNX) were heated with 21.9 g. of isophorone diamine (about 11.2 moles per mole of "Hycar" CTBNX) and 40.7 g. of trimethylhexamethylene diamine (about 22.4 moles per mole of "Hycar" CTBNX) to a temperature of about 210° C. under nitrogen. The acid value was followed until a 75% level was reached. The temperature was then lowered to about 120° C. and 37.6 g. of benzyl alcohol and 10.0 g. of p-toluene-sulphonamide added. The reaction mixture (epoxy resin curing composition E) was cooled to ambient temperature.

EXAMPLE XXI 52.4 g. of isophorone diamine, 42.8 g. of trimethylhexamethylene diamine, 51.6 g. of benzyl alcohol and 12.0 g.

of p-toluenesulphonamide were blended at ambient temperature to produce epoxy resin curing composition F for comparative purposes.

EXAMPLE XXII

An epoxy resin curing composition G was prepared by mixing 190.2 g. and 210.6 g. of epoxy resin curing composition A and B, respectively.

The epoxy curing compositions G, C and D were used to prepare surface coatings from a base material comprising commercially available Epon® Resin 828 (having an epoxide equivalent weight of from 182 to 194 and a viscosity at 25° C. of from 100 to 150 poise). The base material to be cured comprised:

|  | Percent by wt. |
|---|---|
| Epon® Resin 828 | 100.00 |
| Benzyl alcohol | 6.00 |
| Triphenyl phosphite | 8.00 |
| Magnesium oxide | 0.08 |

The epoxy resin curing compositions E and F were used to prepare surface coatings from a base material comprising only Epon® Resin 828.

The amounts of epoxy resin curing agent compositions used to cure the above base materials are given in Table VI.

The base material was mixed with the curing agent composition and brush applied to degreased grit-blasted "Gold Seal" steel panels as described in Example VI. The film properties were measured using the techniques described in Example VI and the results obtained are given in Table VI.

From the results presented in Tables II, IV, V and VI it can be seen that the hard surface coatings prepared by curing polyepoxide systems with the epoxy resin curing agent compositions according to the invention have better flexibility, impact resistance and adhesion than surface coatings prepared by curing polyepoxide systems with epoxy resin curing agent compositions not containing a polymer.

I claim as my invention:

1. An epoxy resin curing agent composition prepared by reacting at a temperature above about 110° C.,
    (a) 100 parts by weight of at least one diprimary amine,
    (b) 20 to 60 parts by weight of a butadiene/acrylonitrile copolymer having carboxyl or mercaptan reactive groups, an equivalent weight of more than 500 and a Brookfield viscosity at 25° C. of less than 2,000 poise, and
    (c) 30 to 120 parts by weight of a polyepoxide having more than one vicinal epoxy group, and wherein the reaction product contains unreacted diprimary amine.

2. A composition as in claim 1 wherein the polyepoxide is a polyglycidyl ester of polymeric unsaturated fatty acids.

3. A composition as in claim 2 wherein the polyepoxide is a diglycidyl ester of dimerized linoleic acid.

4. A composition as in claim 1 wherein (a) is 4,4'-diaminodiphenylmethane.

5. A composition as in claim 1 wherein the diprimary amine is selected from the group consisting of 3,3'-dimethyl-4,4'-diamino dicyclohexyl methane, isophorone diamine and mixtures thereof.

6. A composition as in claim 1 wherein the up to 50% by weight of the total composition of a benzyl alcohol is additionally present.

7. A composition as in claim 1 wherein up to 20% by weight, based on the undiluted composition, of an epoxy-amine accelerator is additionally employed.

8. A composition as in claim 7 wherein the accelerator is salicylic acid.

TABLE VI

| | Amount of curing agent composition used (per 100 g. Epon® Resin 828), g. | Konig hardness (sec.), 23° C., after— | | | Erichsen | | Conical mandrel (in.) | |
|---|---|---|---|---|---|---|---|---|
| | | 24 hrs. | 48 hrs. | 8 days | Slow penetration (mm. average) | Direct impact (mm.) | Flexibility | Adhesion |
| Epoxy resin curing agent composition used: | | | | | | | | |
| G | 61.0 | 82 | 124 | 139 | 9.5 | P 6 | P ½ | NLA |
| C | 38 | 81 | 109 | 150 | 0.6 | P 2½ | F 1½ | NLA |
| D | 48 | 129 | 154 | 160 | 0.5 | P 2 | F 1½ | NLA |
| E | 42 | 161 | 181 | 189 | 0.8 | P 2 | F 1½ | P ⅝ |
| F | 37.4 | 70 | 107 | 163 | 9.9 | P 5 | P ½ | NLA |

NOTE.—NLA=No loss of adhesion to ½" mandrel.

References Cited

UNITED STATES PATENTS

| 3,297,608 | 1/1967 | Noshay et al. | 260—23.7 |
| 3,625,918 | 12/1971 | Heer et al. | 260—94.2 |
| 3,639,344 | 2/1972 | Kinnemann et al. | 260—836 |
| 3,436,359 | 4/1969 | Hubin et al. | 260—47 |
| 3,538,185 | 11/1970 | Davis Jr. et al. | 260—837 |
| 2,952,043 | 9/1960 | Uraneck et al. | 260—23.7 |
| 3,215,670 | 11/1965 | Shokal et al. | 260—23.7 |
| 3,399,248 | 8/1968 | Wolinski | 260—837 |

OTHER REFERENCES

"Rubber World," October 1968, pp. 51–58.

DONALD E. CZAJA, Primary Examiner

E. C. RZUCIDLO, Assistant Examiner

U.S. Cl. X.R.

260—18 EP, 18 PN, 23.7 R, 94.2 R, 836, 837 R